United States Patent [19]

Song

[11] Patent Number: 5,563,654
[45] Date of Patent: Oct. 8, 1996

[54] WHITE BALANCING APPARATUS UTILIZING ONLY THE ACHROMATIC COLOR COMPONENTS IN THE INFORMATION FOR WHITE BALANCE

[75] Inventor: Joong S. Song, Seoul, Rep. of Korea

[73] Assignee: Goldstar Co., Ltd., Seoul, Rep. of Korea

[21] Appl. No.: 364,968

[22] Filed: Dec. 28, 1994

[30]  Foreign Application Priority Data

Dec. 30, 1993 [KR] Rep. of Korea ............................ 31638

[51] Int. Cl.$^6$ ....................................................... H04N 9/73
[52] U.S. Cl. ........................... 348/223; 348/225; 348/655
[58] Field of Search ................................... 348/223, 225, 348/228, 655, 657, 698; H04N 9/23

[56]  References Cited

U.S. PATENT DOCUMENTS

| | | | |
|---|---|---|---|
| 4,065,790 | 12/1977 | Siegel | 348/698 |
| 4,736,241 | 4/1988 | Murakami et al. | 348/223 |
| 4,797,733 | 3/1989 | Takagi et al. | 348/223 |
| 5,182,636 | 1/1993 | Kikuchi et al. | 348/225 |
| 5,361,093 | 11/1994 | Yamamoto et al. | 348/223 |

FOREIGN PATENT DOCUMENTS

| | | | |
|---|---|---|---|
| 260790 | 11/1986 | Japan | H04N 9/73 |
| 026193 | 1/1990 | Japan | H04N 9/73 |

*Primary Examiner*—Safet Metjahic
*Assistant Examiner*—Glenton B. Burgess
*Attorney, Agent, or Firm*—John P. White

[57]  ABSTRACT

A white balancing apparatus used for video camera a signal processor for outputting red, green and blue component signals in processing a video signal, an integrator for integrating the output signal of the signal processor, a gate for determining the input video signal whether it is a chromatic signal by using the output signal of the signal processor and for gating the output signal of the signal processor so as to be input to or blocked from the integrator, and a microcomputer for adjusting the gain value of the output signal of the signal processor depending on the output signal of the integrator. Therefore, the white balance performance for the chromatic color components of the photographed object itself is prevented but only the achromatic components are used in performing the white balance, thereby enabling to output cleaner colors.

12 Claims, 8 Drawing Sheets

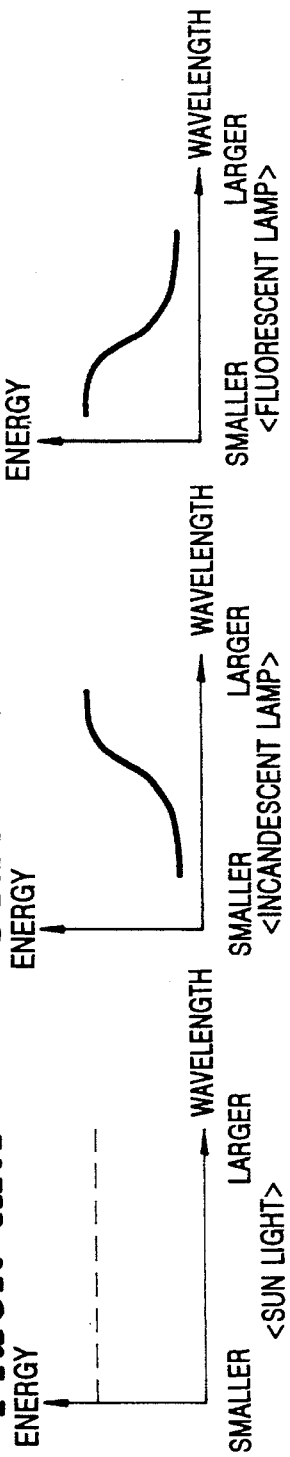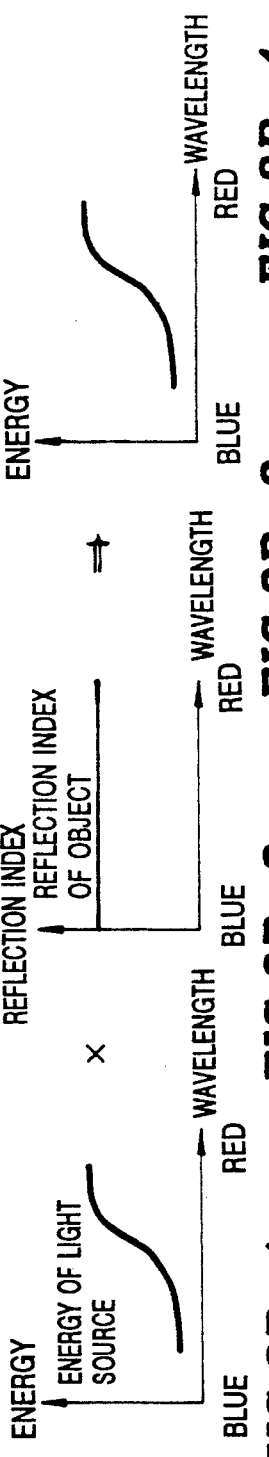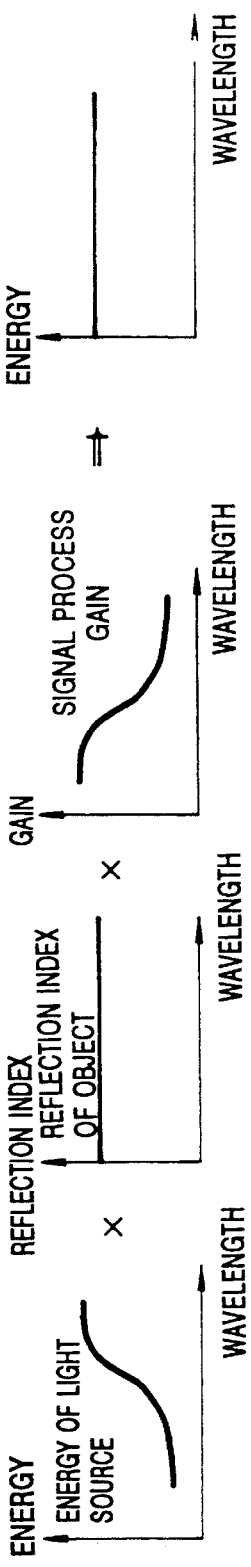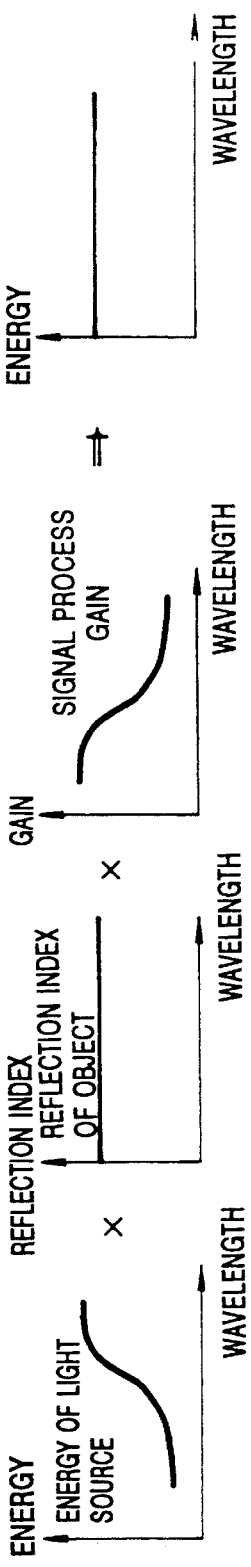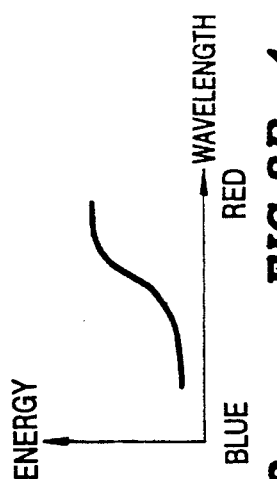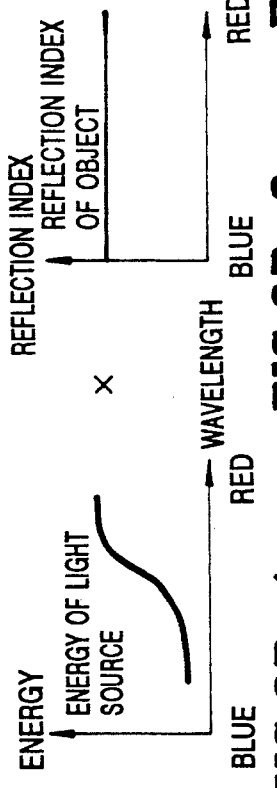

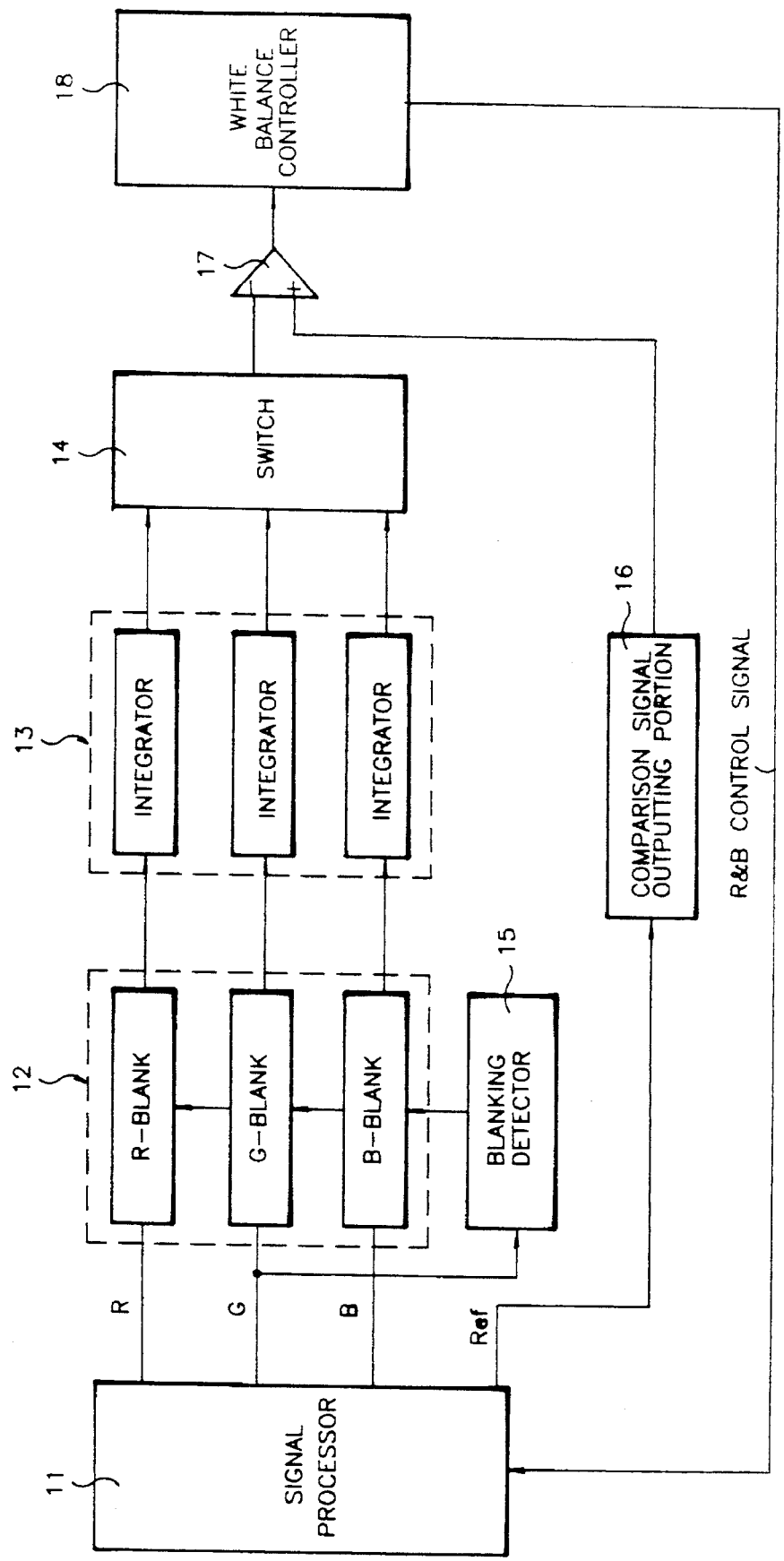

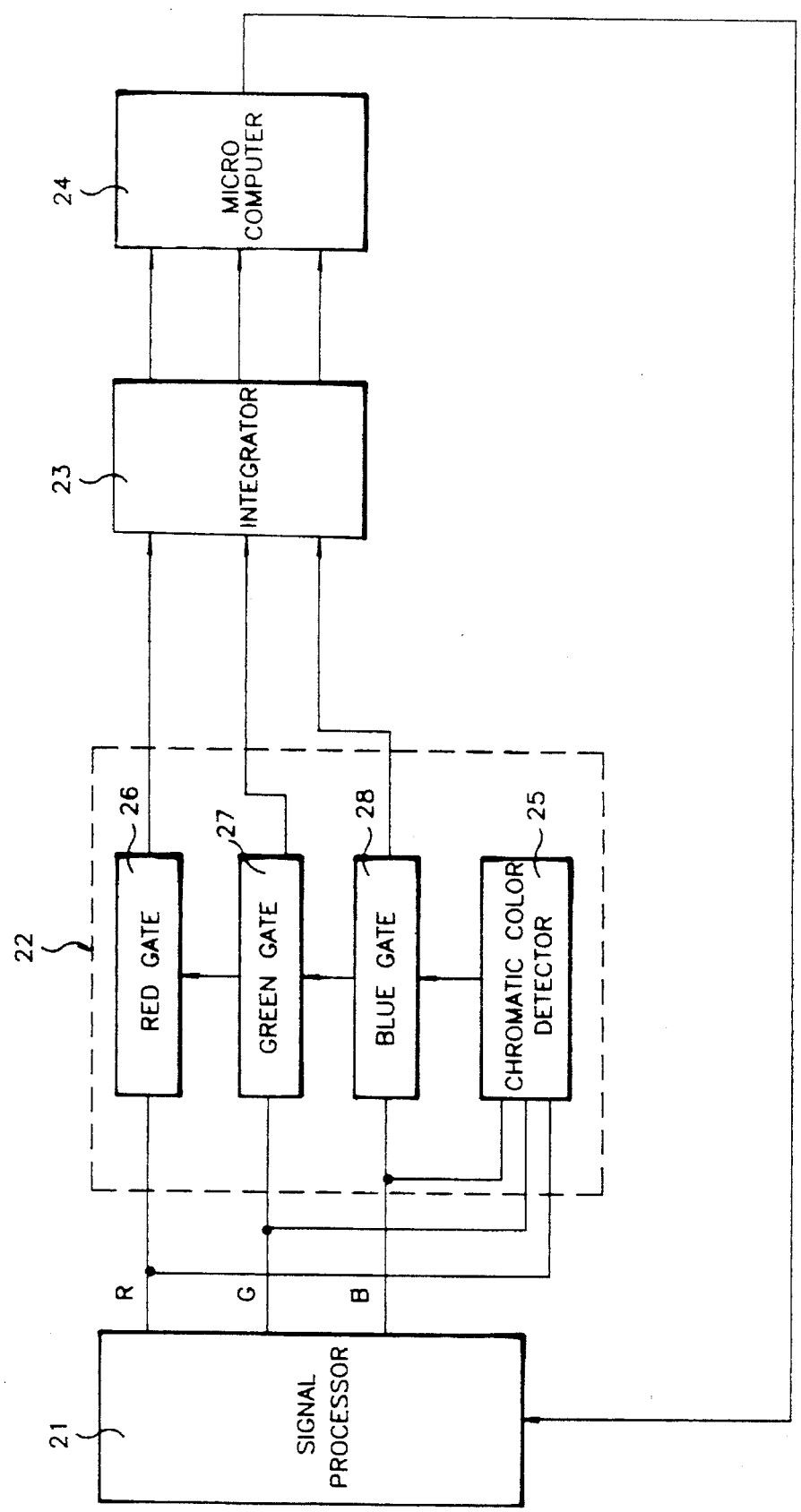

WHITE BALANCING APPARATUS UTILIZING ONLY THE ACHROMATIC COLOR COMPONENTS IN THE INFORMATION FOR WHITE BALANCE

BACKGROUND OF THE INVENTION

The present invention relates to a white balancing apparatus in use for a video camera.

In general, although white is sensed as it is by the human visual system under any light source, e.g., sun light, fluorescent light or incandescent light, it becomes red or blue depending on the light source, through image pickup device of a video camera. This is because of a color temperature. The higher color temperature makes white blue and the lower color temperature makes white red, thereby disabling to realize a proper color.

The light source is varied in its energy distribution according to wavelength, depending on its type, as shown in FIG. 1. That is to say, the sun light has a constant energy distribution according to wavelength, as shown in FIG. 1A, the incandescent light whose color temperature is low has the distribution of energy which increases in proportion with wavelength, as shown in FIG. 1B, and the fluorescent light whose color temperature is high has the distribution of energy which decreases in disproportion with wavelength, as shown in FIG. 1C.

Human visual system has a color adaptive capability with respect to such light source by memory. However, charge-coupled device (CCD) imager does not have the color adaptive capability. Thus, the information on the light source is estimated from the signal input from the CCD imager to minimize the affect of the light source.

As described above, the white balance implements an object color varied according to light source whose energy distribution is different depending on wavelength as that under the sun light and will be explained with reference to FIGS. 2A and 2B.

FIGS. 2A and 2B explain the process of treating the white balance by the white implementation under the incandescent light.

If the energy of the light source depending on the wavelength of the incandescent lamp is increasingly distributed proportionately to the wavelength as shown in FIGS. 2A-1 and the reflection index of the object having white color components is as shown in FIG. 2A-2, the white through the incandescent lamp is recognized practically as good as a red. In order to process the white balance, gain is multiplied with the light source whose energy distribution depends on wavelength so that the object can be recognized as a white as through the sun light.

That is to say, if the energy of the light source depending on the wavelength of the incandescent lamp as shown in FIG. 2A-1 is multiplied with the energy depending on the wavelength of the white object as shown in FIG. 2A-2, the energy of the color as recognized under the incandescent lamp, with which the gain corresponding to the light source having the magnitude opposite to the energy of the light source depending on the wavelength of the incandescent lamp is multiplied to be recognized as the original white object under the sun light.

As shown in FIG. 3, the conventional white balancing apparatus includes a signal processor 11 for a video camera, a blanking portion 12 to which red component signal R, green component signal G and blue component signal B output from the signal processor 11 are input for performing the white balance, a blanking detector 15 for outputting the blank pulse generated according to the magnitude of the green component signal G output from the signal processor 11 to the blanking portion 12, an integrator 13 for respectively integrating the non-blanked red component signal R, green component signal G and blue component signal B, a switch for inputting and switching the integrated signal for each field, i.e., 1/60 seconds interval, a comparator 17 for receiving the signal output from the switch 14 as an inverted input, a comparison signal outputting portion 16 for generating a jagged wave by receiving a reference signal Ref output from the signal processor 11 and then outputting as the non-inverted input of the comparator 17, and a white balance controller 18 for inputting the pulsewidth modulation signal output from the comparator 17 and then outputting red and blue color control signals to the signal processor 11.

The operation of the conventional white balancing apparatus having the aforementioned configuration will now be described.

The red component signal R, green component signal G and blue component signal B are output from the signal processor 11. Among them, the level of the green component signal G is determined in the blanking detector 15. If the level thereof exceeds a constant value, the green component signal G is recognized as the light source or high luminance portion to then generate blanking pulse. The blanking pulse output from the blanking detector 15 is input to the blanking portion 12 to then blank the three color component signals, i.e., the red component signal R, green component signal G and blue component signal B are output from the signal processor 11.

Also, as the result of the determination of the blanking detector 15, if the green component signal G output form the signal processor 11 is below a constant value, it is recognized as a general object so that the blanking pulse is not generated. At this time, the non-blanked three color component signals, i.e., the red component signal R, green component signal G and blue component signal B, are integrated in the integrator 13, respectively, and thereafter, are switched in the switch 14 in each field to then be supplied to the non-inverted input port of the comparator 17.

Meanwhile, the reference signal Ref of the three color component signal is turned into a jagged wave in the comparison signal outputting portion 16 to then be supplied to the non-inverted input port of the comparator 17. The comparator 17 compares the signal output from the switch 14 and the jagged wave output from the comparison signal outputting portion 16 to then output to the white balance controller 18 the pulsewidth modulation signal whose pulsewidth is varied depending on the signal level output from the switch 14.

The white balance controller 18 detects each width of the input pulsewidth modulation signal, calculates red component signal pulsewidth/green component signal pulsewidth (R/G) and blue component signal pulsewidth/green component signal pulsewidth (B/G) and outputs red and blue control signals which allows the calculated results to be '1' that is R/G=B/G=1, to the signal processor 11. This is because it is assumed that R=G=B in the case of achromatic color signals, white, gray and black color signals.

Green component signal G used in the blanking detector 15 of the aforementioned conventional white balancing apparatus excludes the signal components of the light source or high luminance during performing the white balance but makes only the signals of an ordinary luminance to be used as the signals for performing the white balance.

However, since the conventional white balancing apparatus performs the white balance by receiving the chromatic color signal of the photographed object itself together with color signal caused by illumination, if the photographed object itself has the chromatic color component such as red or blue component, irrespective of the light source, the color signal is also used as information for performing the white balance to decolorize the color signal.

SUMMARY OF THE INVENTION

To overcome the aforementioned problem, it is an object of the present invention to provide a white balancing apparatus for producing clean colors by repressing the white balance performance with respect to the chromatic color components of an photographed object itself but utilizing only the achromatic color components as the information for the white balance performance.

To accomplish the above object, the white balancing apparatus according to the present invention comprises:

- a signal processing means for outputting red, green and blue component signals in processing a video signal;
- an integrating means for integrating the output signal of the signal processing means;
- a gating means for determining the input video signal whether it is a chromatic signal by using the output signal of the signal processing means and for gating the output signal of the signal processing means so as to be input to or blocked from the integrating means; and
- a microcomputer for adjusting the gain value of the output signal of the signal processing means depending on the output signal of the integrating means.

BRIEF DESCRIPTION OF THE DRAWINGS

The above objects and advantages of the present invention will become more apparent by describing in detail a preferred embodiment thereof with reference to the attached drawings in which:

FIGS. 1A to 1C shows energy distribution depending in types of light source and wavelength;

FIG. 2 shows the process of treating white balance under the incandescent light;

FIG. 3 is a block diagram of a conventional white balancing apparatus;

FIG. 4 is a block diagram of a white balancing apparatus according to the present invention;

DETAILED DESCRIPTION OF THE INVENTION

Figure 5A:
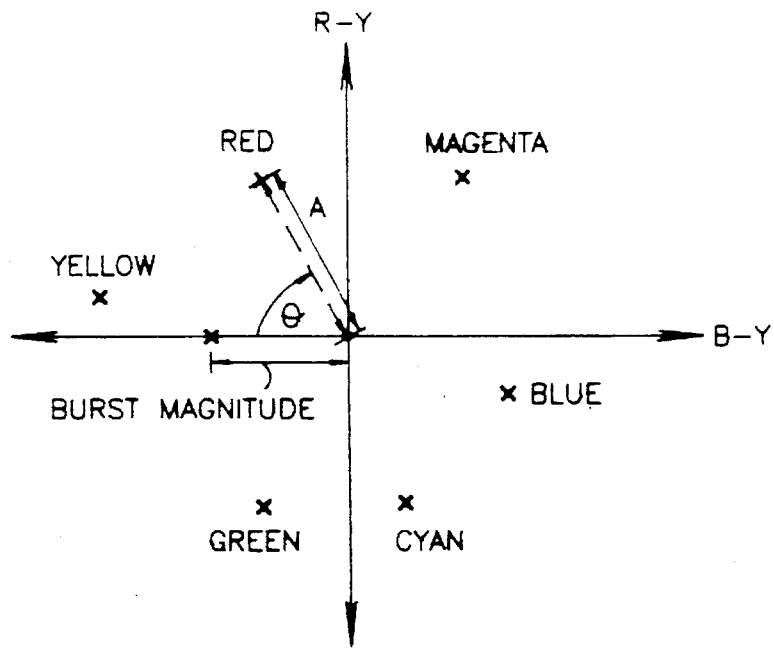
FIGS. 5A and 5B show vector scopes of colors.

The white balancing apparatus according to the present invention includes a signal processor 21, a gate 22, an integrator 23 and a microcomputer 24, as shown in FIG. 4.

The signal processor 21 processes a video signal to the produce color component signals, that is, red component signal R, green component signal G and blue component signal B.

The gate 22 determines the input signal whether it is chromatic color signal using the red component signal R, green component signal G and blue component signal B output from the signal processor 21 and gates the red component signal R, green component signal G and blue component signal B for a white balance so as to repress the red component signal R, green component signal G and blue component signal B to be output to the integrator 23.

The gate 22 includes a chromatic color detector 25 for detecting whether the input signal is chromatic color signal, i.e., red, green, blue or magenta color, using the red component signal R, green component signal G and blue component signal B output from the signal processor 21, a red color gate 26 for gating the red component signal R output from the signal processor 21 depending on the signal output from the chromatic color detector 25, a green color gate 27 for gating the green component signal G output from the signal processor 21 depending on the signal output from the chromatic color detector 25, and a blue color gate 28 for gating the blue component signal B output from the signal processor 21 depending on the signal output from the chromatic color detector 25.

The integrator 23 integrates the red component signal R, green component signal G and blue component signal B output from the gate 22, respectively.

The microcomputer 24 outputs a gain for a white balance to the signal processor 21 depending on the signal output from the integrator 22.

The operation of the white balancing apparatus according to the present invention having the aforementioned configuration will be described.

An input video signal is processed in the signal processor 21 and is separated into a red component signal R, a green component signal G and a blue component signal B to then be output.

The red component signal R, green component signal G and blue component signal B output from the signal processor 21 are input to the chromatic detector 25 and are used for detecting whether the input video signal is a chromatic color signal or not.

Here, the operation of the chromatic detector 24 for detecting chromatic colors will be described with reference to FIGS. 5A, 5B and 6.

Figure 5B:
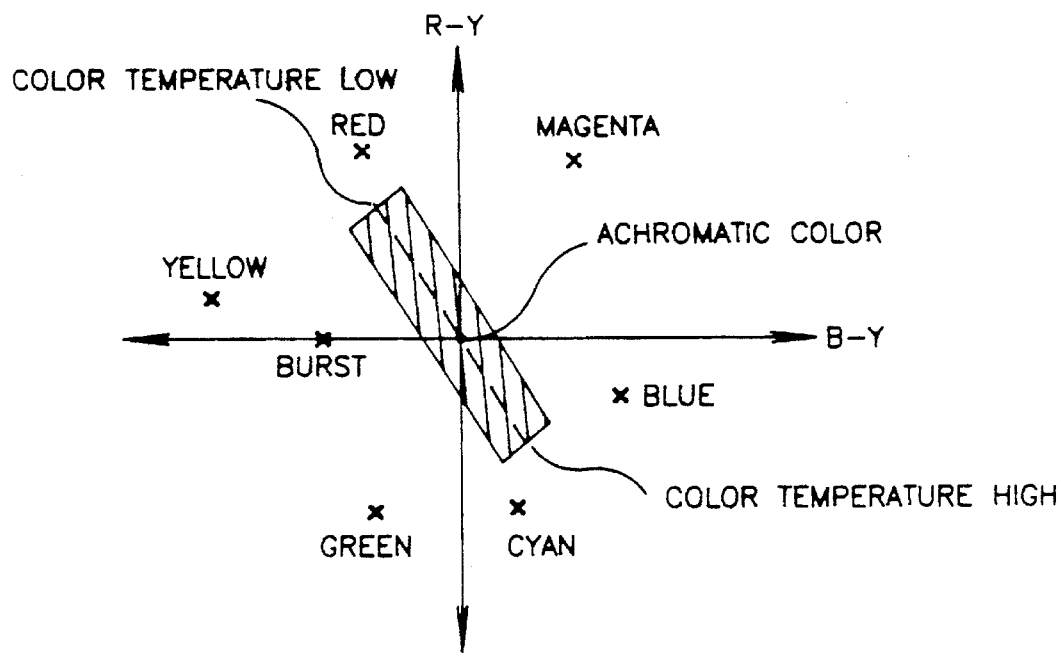

FIGS. 5A shows vector scopes of colors, wherein color component signals representing colors is indicated vectorially. FIG. 5B shows vector scopes of light source and chromatic colors, wherein the induction state of the chromatic component by the light source is indicated. FIG. 6 shows a vector scope by a chromatic color, wherein the chromatic color region excluded in performing the white balance is indicated.

As shown in FIG. 5A, θ represents color, A represents the magnitude of a color, the origin represents an achromatic color in the state when the red component signal R, green component signal G and blue component signal B are all "1's"; R=G=B=1, with respect to Y axis representing luminance. Red, green, blue and magenta colors are indicated by θ, and color components and the magnitude of the corresponding color components are separated according to θ and A. The oblique-lined portion in FIG. 5B is the achromatic portion which is regarded as the induction of the chromatic color components owing to color temperature, wherein red and green gain signals are formed so that the red component signal R, green component signal G and blue component signal B are all the same to be "1's" that is, R=G=B=1. That is to say, if the color temperature of the light source is low, the achromatic portion is moved toward the red portion. If the color temperature of the light source is high, the achromatic portion is moved toward the blue portion.

By the magnitude of the red component signal R, green component signal G and blue component signal B, only the data adjacent to the luminance axis (Y) are regarded as the data owing to the light source and the remaining portion is regarded as chromatic portion, which are detected in the chromatic color detector 25 to then be gated.

Figure 6:
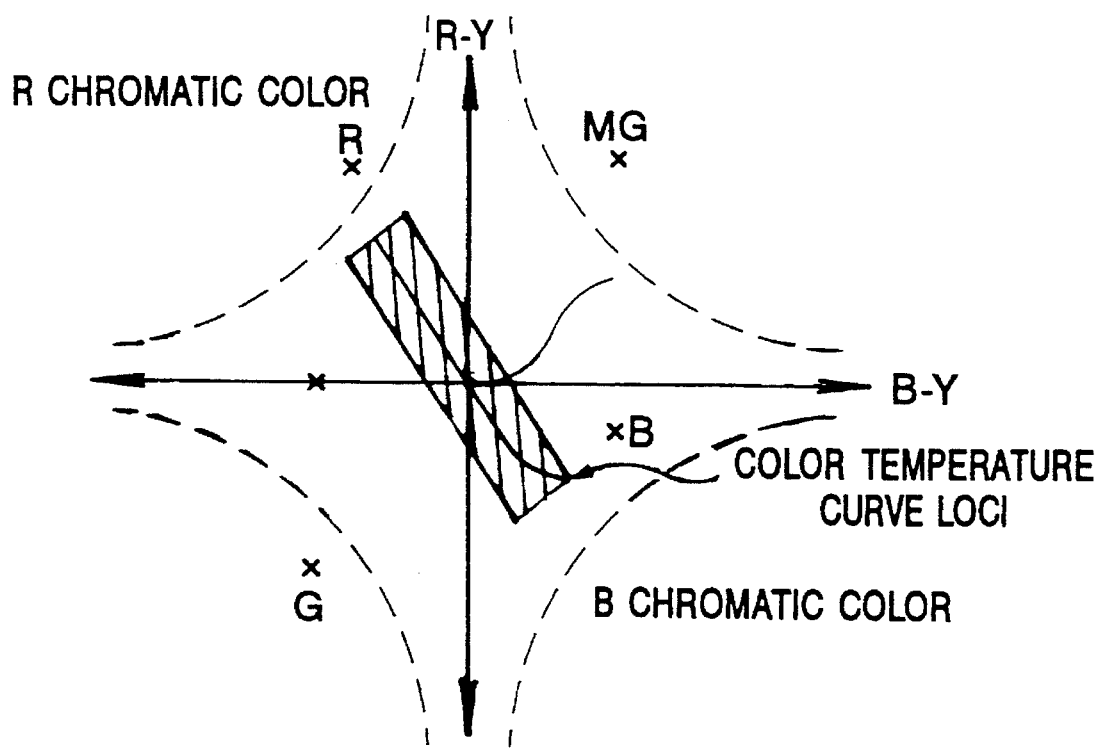
FIG. 6 shows a vector scope by a chromatic color.
Figure 7:
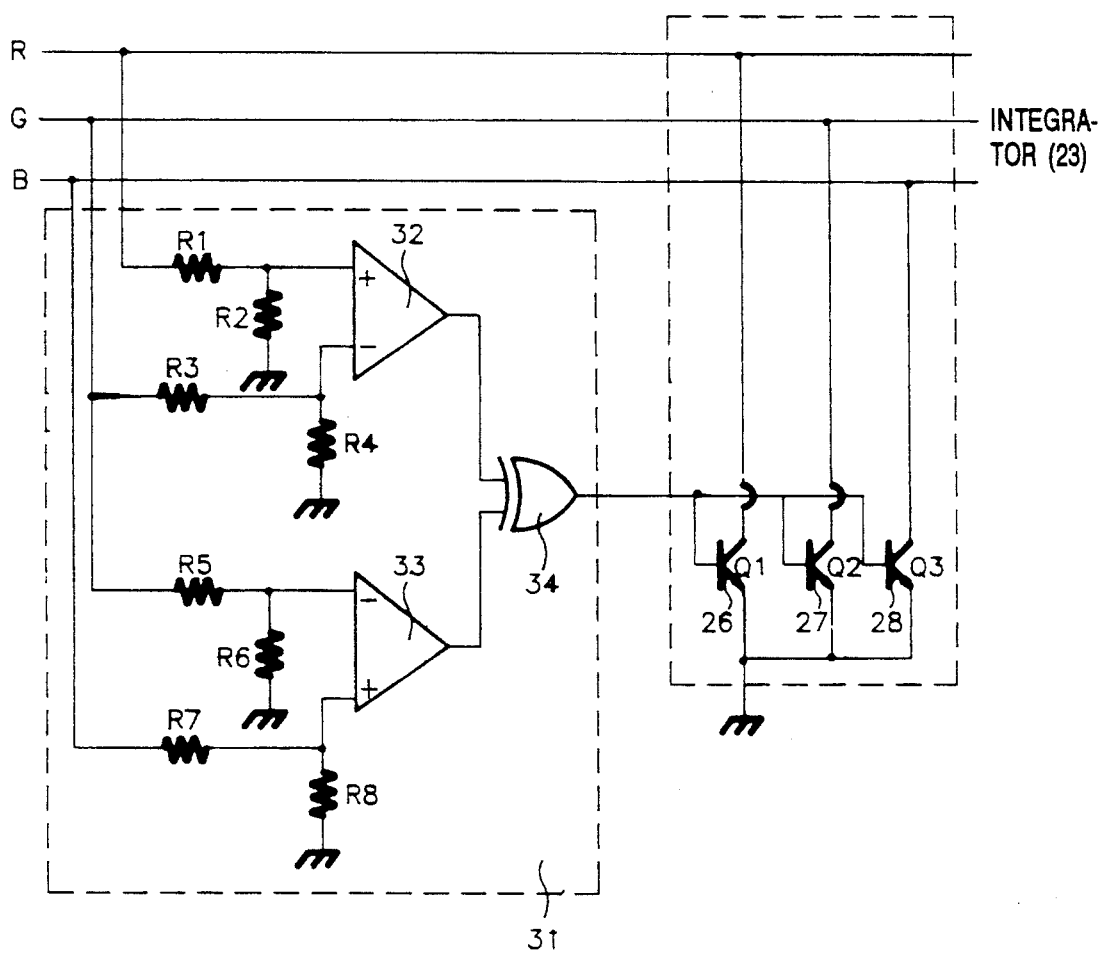
FIG. 7 is a detailed block diagram of red, green blue gating portions and chromatic detector according to an embodiment of the present invention.

Since green or magenta have nothing to do with the movement of white points depending on the color temperature of the light source on the vector scope shown in FIG. 6, they are not changed during the white balance. In other words, only the oblique-lined portion in FIG. 6 is regarded as the white balance trace region and the data being in the outer portion of dotted lines are gated, thereby minimizing the error of the data of the light source owing to the chromatic color. That is to say, as shown in FIG. 6, since the positions of the white points are changed along the axis linking red and green depending on the color temperature curve, only the data adjacent of the curve are used in processing the white balance.

At this time, if the red component signal R or blue component signal B are significantly greater than the green component signal G; R>>G or B>>G, since they are indicated as red or blue chromatic color region, they should be gated. Also, if the green component signal G is significantly greater than the red component signal R and blue component signal B; G>>R and G>>B, since it is indicated as a green chromatic region, it should be gated. Also, if the red component signal R and blue component signal B are significantly greater than the green component signal G; R>G and R>B, since it is indicated as a magenta chromatic region, it should be gated.

As the result of the operation of the chromatic color detector 25, if the video signal is a chromatic signal, the signal is processed as a unnecessary signal to prevent the red component signal R, green component signal G and blue component signal B output from the signal processor 21 by gating the red gate 26, green gate 27 and blue gate 28 in the chromatic color detector 25 from being output to the integrator 23.

Also, as the result of the operation of the chromatic color detector 25, if the video signal is not a chromatic signal, the signal allows the red component signal R, green component signal G and blue component signal B output from the signal processor 21 by non-gating the red gate 26, green gate 27 and blue gate 28 in the chromatic color detector 25 to be output to the integrator 23.

The red component signal R, green component signal G and blue component signal B respectively output through the red gate 26, green gate 27 and blue gate 28 are integrated in the integrator 23 and are processed in the microcomputer 24 to then be output as a gain for processing the white balance of the video signal input to the signal processor 21. That is to say, assuming that R=G=B=1 in the case of achromatic color, the microcomputer 24 detects the integrated values of the respective color component signals output from the integrator 23 and calculates the red component signal pulsewidth/green component signal pulsewidth (R/G) and blue component signal pulsewidth/green component signal pulsewidth (B/G) and outputs red and blue control signals which allows the calculated results to be '1', that is, R/G=B/G=1, the gains, to the signal processor 11.

According to an embodiment of the chromatic color detector 25 shown in FIG. 4, the chromatic color detector includes a red and blue determiner 31 for determining whether an input video signal is red and blue chromatic color signal using the red component signal R, green component signal G and blue component signal B output from the signal processor 21.

Here, the red and blue determiner 31 is constituted by a comparator 32 having the red component signal R output from the signal processor 21 as an input of the non-inverted input port by adjusting resistances R1 and R2, and a reference signal by the green component signal G output from the signal processor 21, i.e., a reference signal formed by adjusting resistances R3 and R4 as an input of the inverted input port, a comparator 33 having the blue component signal B output from the signal processor 21 as an input of the non-inverted input port by adjusting resistances R7 and R8, and a reference signal by the green component signal G output from the signal processor 21, i.e., a reference signal formed by adjusting resistances R5 and R6 as an input of the inverted input port, and an exclusive OR gate 34 for performing an EX-OR operation with respect to the signal output from the comparators 32 and 33.

Here, the resistances R1, R2, R7 and R8 adjusts the magnitudes of the input red and blue component signals for their comparison and the resistances R3, R4, R5 and R6 adjusts the magnitude of the input green component signal for setting a reference value for a comparison. That is say, the reference for determining chromatic color can be set using the resistances R1 to R8.

The red gate 26 shown in FIG. 4 includes a transistor Q1 having the signal output from the chromatic color detector 25 as a gate input and the red component signal R output from the signal processor 21 as a collector input, and a grounded emitter for switching.

The green gate 27 shown in FIG. 4 includes a transistor Q2 having the signal output from the chromatic color detector 25 as a gate input and the green component signal G output from the signal processor 21 as a collector input, and a grounded emitter for switching.

The blue gate 28 shown in FIG. 4 includes a transistor Q3 having the signal output from the chromatic color detector 25 as a gate input and the blue component signal B output from the signal processor 21 as a collector input, and a grounded emitter for switching.

The operation of an embodiment of the chromatic color detector 25 having the aforementioned configuration and the red gate 26, blue gate 27 and red gate 28 will be described.

If the input video signal is red chromatic color signal, the red component signal R output from the signal processor 21 becomes significantly greater than the green component signal G and blue component signal B. Therefore, the red component signal R output from the signal processor 21 becomes greater than the reference signal by the green component signal G so that the comparator 32 outputs a logic '1' signal of high level. Also, the blue component signal B output from the signal processor 21 becomes less than the reference signal by the green component signal G so that the comparator 33 outputs a logic '0' signal of low level. Accordingly, the exclusive OR gate 34 outputs a logic '1' signal to then indicate that the video signal output from the signal processor 21 is a chromatic color signal, thereby turning off the transistors Q1, Q2 and Q3, so that the red component signal R, green component signal G and blue component signal B output from the signal processor 21 are gated.

Also, if the input video signal is blue chromatic color signal, the blue component signal B output from the signal processor 21 becomes significantly greater than the green component signal G and red component signal R. Therefore, the blue component signal B output from the signal processor 21 becomes greater than the reference signal by the green component signal G so that the comparator 33 outputs a logic '1' signal of high level. Also, the red component signal R output from the signal processor 21 becomes less than the reference signal by the green component signal G so that the comparator 32 outputs a logic '0' signal of low level. Accordingly, the exclusive OR gate 34 outputs a logic '1' signal to then indicate that the video signal output from the signal processor 21 is a chromatic color signal, thereby turning off the transistors Q1, Q2 and Q3, so that the red component signal R, green component signal G and blue component signal B output from the signal processor 21 are gated.

Figure 8:
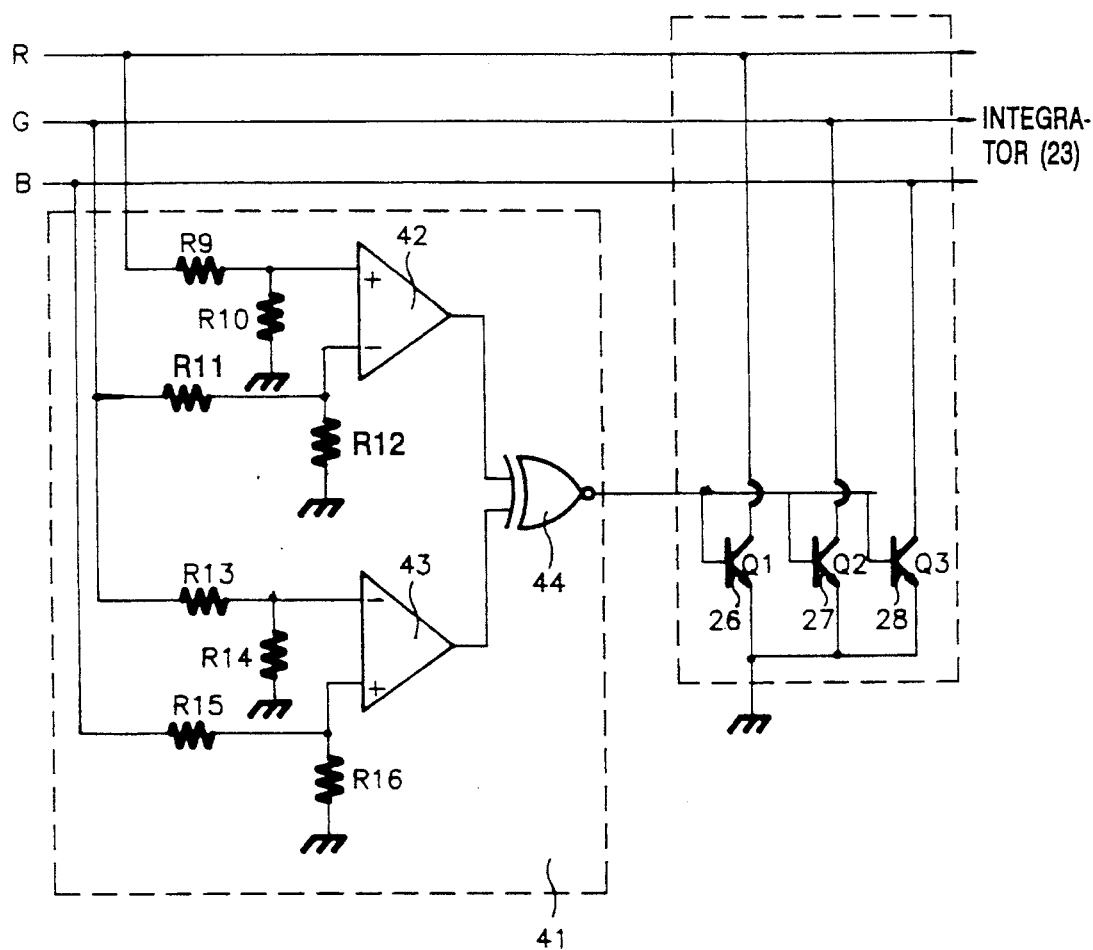
FIG. 8 is a detailed block diagram of red, green blue gating portions and chromatic detector according to another embodiment of the present invention.

According to another embodiment of the chromatic color detector 25 shown in FIG. 4 includes a green and magenta determiner 41 for determining whether the input video signal is green and magenta chromatic color using the red component signal R, green component signal G and blue component signal B output from the signal processor 21, as shown in FIG. 8.

Here, the green and magenta determiner 41 is constituted by a comparator 42 having the red component signal R output from the signal processor 21 as an input of the non-inverted input port by adjusting resistances R9 and R10, and a reference signal by the green component signal G output from the signal processor 21, i.e., a reference signal formed by adjusting resistances R11 and R12 as an input of the inverted input port, a comparator 33 having the blue component signal B output from the signal processor 21 as an input of the non-inverted input port by adjusting resistances R15 and R16, and a reference signal by the green component signal G output from the signal processor 21, i.e., a reference signal formed by adjusting resistances R13 and R14 as an input of the inverted input port, and an exclusive NOR gate 44 for performing an EX-NOR operation with respect to the signal output from the comparators 42 and 43.

Here, the resistances R9, R10, R15 and R16 adjusts the magnitudes of the input red and blue component signals for their comparison and the resistances R11, R12, R13 and R14 adjusts the magnitude of the input green component signal for setting a reference value for a comparison. That is say, the reference for determining chromatic color can be set using the resistances R9 to R16.

The operation of the chromatic color detector 25 having the aforementioned configuration will now be described.

If the input video signal is green chromatic color signal, the green component signal G output from the signal processor 21 becomes significantly greater than the red component signal R and blue component signal G. Therefore, the red component signal R output from the signal processor 21 becomes less than the reference signal by the green component signal G so that the comparator 32 outputs a logic '0' signal of low level. Also, the blue component signal B output from the signal processor 21 becomes less than the reference signal by the green component signal G so that the comparator 33 outputs a logic '0' signal of low level. Accordingly, the exclusive OR gate 34 outputs a logic '1' signal to then indicate that the video signal output from the signal processor 21 is a chromatic color signal, thereby turning off the transistors Q1, Q2 and Q3, so that the red component signal R, green component signal G and blue component signal B output from the signal processor 21 are gated.

Also, if the input video signal is magenta chromatic color signal, the blue component signal B and red component signal R output from the signal processor 21 becomes significantly greater than the green component signal G. Therefore, the blue component signal B output from the signal processor 21 becomes less than the reference signal by the green component signal G so that the comparator 43 outputs a logic '1' signal of high level. Also, the red component signal R output from the signal processor 21 becomes less than the reference signal by the green component signal G so that the comparator 42 outputs a logic '1' signal of high level. Accordingly, the exclusive NOR gate 34 outputs a logic '1' signal to then indicate that the video signal output from the signal processor 21 is a magenta chromatic color signal, thereby turning off the transistors Q1, Q2 and Q3, so that the red component signal R, green component signal G and blue component signal B output from the signal processor 21 are gated.

Figure 9:
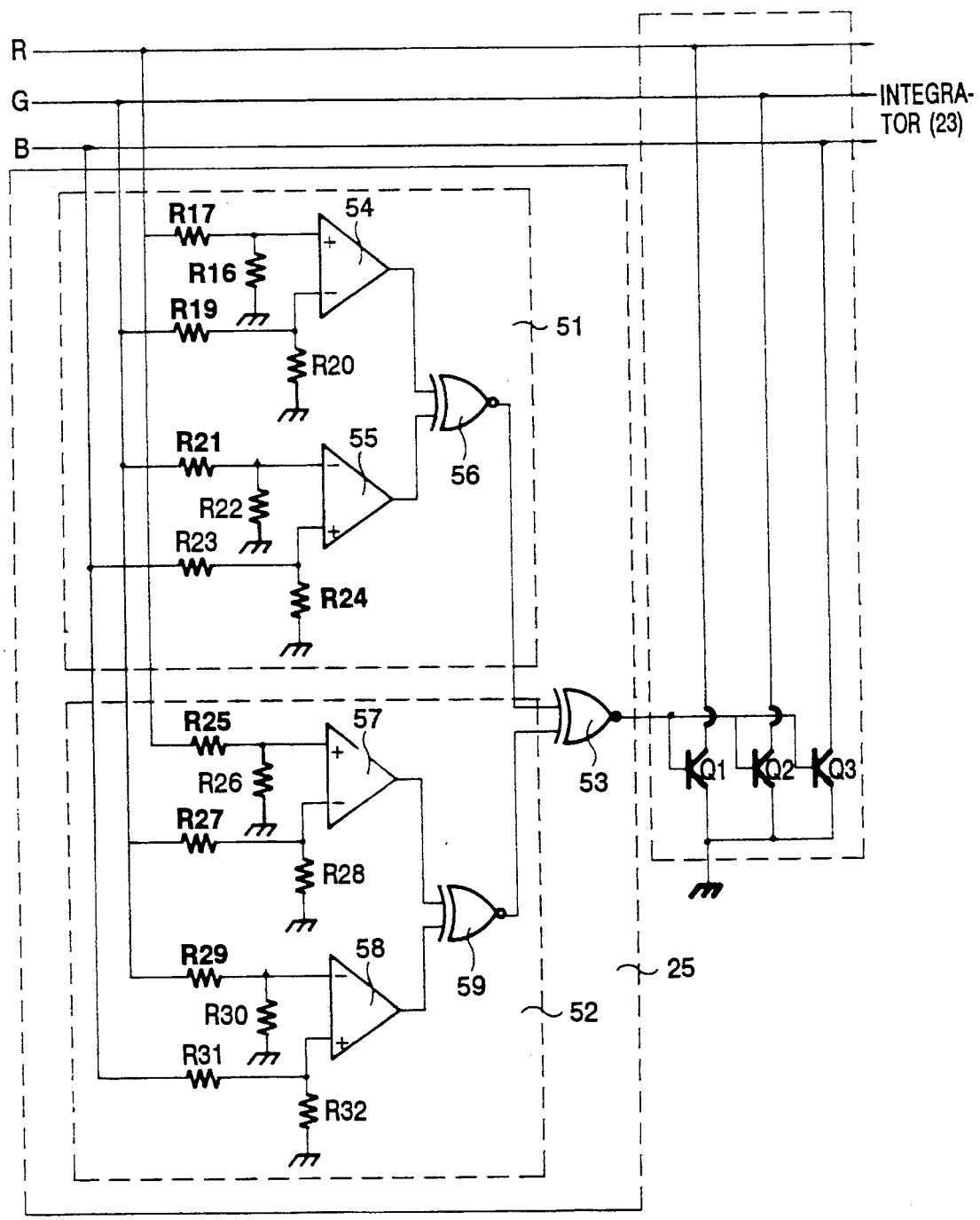
FIG. 9 is a detailed block diagram of red, green blue gating portions and chromatic detector according to still another embodiment of the present invention.

According to still another embodiment of the chromatic color detector 25 shown in FIG. 4 includes a red and blue determiner 51 for determining whether the input video signal is red and blue chromatic color using the red component signal R, green component signal G and blue component signal B output from the signal processor 21, a green and magenta determiner 52 for determining whether the input video signal is green and magenta chromatic color using the red component signal R, green component signal G and blue component signal B output from the signal processor 21, and an OR gate for performing an OR operation with respect to the signals output from the red and blue determiner 51 and green and magenta determiner 52, as shown in FIG. 9.

Here, the red and blue determiner 51 is constituted by a comparator 57 having the red component signal R output from the signal processor 21 as an input of the non-inverted input port by adjusting resistances R25 and R26 and a reference signal by the green component signal G output from the signal processor 21, i.e., a reference signal formed by adjusting resistances R27 and R28 as an input of the inverted input port, a comparator 58 having the blue component signal B output from the signal processor 21 as an input of the non-inverted input port by adjusting resistances R31 and R32, and a reference signal by the green component signal G output from the signal processor 21, i.e., a reference signal formed by adjusting resistances R29 and R30 as an input of the inverted input port, and an exclusive NOR gate 59 for performing an EX-NOR operation with respect to the signal output from the comparators 57 and 58.

Here, the resistances R17, R18, R23, R24, R25, R26, R31 and R32 adjusts the magnitudes of the input red and blue component signals for their comparison and the resistances R19, R20, R21, R22, R27, R28, R29 and R30 adjusts the magnitude of the input green component signal for setting a reference value for a comparison. That is say, the reference for determining chromatic color can be set using the resistances R17 to R32.

The operation of the chromatic color detector 25 according to still another embodiment having the aforementioned configuration will now be described.

If the input video signal is red chromatic color signal, the red component signal R output from the signal processor 21 becomes significantly greater than the green component signal G and blue component signal B. Therefore, the red component signal R output from the signal processor 21 becomes greater than the reference signal by the green component signal G so that the comparator 54 outputs a logic '1' signal of high level. Also, the blue component signal B output from the signal processor 21 becomes less than the reference signal by the green component signal G so that the comparator 55 outputs a logic '0' signal of low level. Accordingly, the exclusive OR gate 56 outputs a logic '1' signal and the OR gate 53 outputs a logic '1' signal irrespective of the signal output from the green and magenta color determiner 52. Therefore, it is indicated that the video signal output from the signal processor 21 is a red chromatic color signal, thereby turning off the transistors Q1, Q2 and Q3, so that the red component signal R, green component signal G and blue component signal B output from the signal processor 21 are gated.

Also, if the input video signal is blue chromatic color signal, the blue component signal B output from the signal processor 21 becomes significantly greater than the green component signal G and red component signal R. Therefore, the blue component signal B output from the signal processor 21 becomes greater than the reference signal by the green component signal G so that the comparator 55 outputs a logic '1' signal of high level. Also, the red component signal R output from the signal processor 21 becomes less than the reference signal by the green component signal G so that the comparator 54 outputs a logic '0' signal of low level. Accordingly, the exclusive OR gate 56 outputs a logic '1' signal and the OR gate 53 outputs a logic '1' signal irrespective of the signal output from the green and magenta color determiner 52. Therefore, it is indicated that the video signal output from the signal processor 21 is a blue chromatic color signal, thereby turning off the transistors Q1, Q2 and Q3, so that the red component signal R, green component signal G and blue component signal B output from the signal processor 21 are gated.

Also, if the input video signal is green chromatic color signal, the green component signal G output from the signal processor 21 becomes significantly greater than the red component signal R and blue component signal G. Therefore, the red component signal R output from the signal processor 21 becomes less than the reference signal by the green component signal G so that the comparator 57 outputs a logic '0' signal of low level. Also, the blue component signal B output from the signal processor 21 becomes less than the reference signal by the green component signal G so that the comparator 58 outputs a logic '0' signal of low level. Accordingly, the exclusive OR gate 59 outputs a logic '1' signal and the OR gate 53 outputs a logic '1' signal irrespective of the signal output from the red and blue color determiner 51. Therefore, it is indicated that the video signal output from the signal processor 21 is a green chromatic color signal, thereby turning off the transistors Q1, Q2 and Q3, so that the red component signal R, green component signal G and blue component signal B output from the signal processor 21 are gated.

Also, if the input video signal is magenta chromatic color signal, the blue component signal B and red component signal R output from the signal processor 21 becomes significantly greater than the green component signal G. Therefore, the blue component signal B output from the signal processor 21 becomes less than the reference signal by the green component signal G so that the comparator 58 outputs a logic '1' signal of high level. Also, the red component signal R output from the signal processor 21 becomes less than the reference signal by the green component signal G so that the comparator 57 outputs a logic '1' signal of high level. Accordingly, the exclusive OR gate 59 outputs a logic '1' signal and the OR gate 53 outputs a logic '1' signal irrespective of the signal output from the red and blue color determiner 51. Therefore, it is indicated that the video signal output from the signal processor 21 is a magenta chromatic color signal, thereby turning off the transistors Q1, Q2 and Q3, so that the red component signal R, green component signal G and blue component signal B output from the signal processor 21 are gated.

As described above, according to the present invention, the white balance performance for the chromatic color components of the photographed object itself is prevented but only the achromatic components are used in performing the white balance, thereby enabling to output cleaner colors.

What is claimed is:

1. A white balancing apparatus comprising:
   a signal processing means for outputting red, green and blue component signals in processing an input video signal;
   an integrating means for integrating the output signals of said signal processing means;
   a chromatic color detecting means for determining whether the input video signal is green and magenta chromatic color signal by using output signals of said signal processing means;
   a gating means for gating the output video signals of said signal processing means so as to be input to or blocked from said integrating means depending on an output of the chromatic color detecting means; and
   a microcomputer for adjusting gains of the signals from said signal processing means depending on the signals from said integrating means.

2. A white balancing apparatus as claimed in claim 1, wherein said gating means comprises:
   the chromatic color detecting means;
   a red color gate for gating the red component signal output from said signal processing means depending on the signal output from said chromatic color detecting means;
   a green color gate for gating the green component signal output from said signal processing means depending on the signal output from said chromatic color detecting means; and
   a blue color gate for gating the blue component signal output from said signal processing means depending on the signal output from said chromatic color detecting means.

3. A white balancing apparatus as claimed in claim 2, wherein said chromatic color detecting means includes a red and blue determiner for determining whether an input video signal is red and blue chromatic color signal using the red component signal, green component signal and blue component signal output from said signal processing means.

4. A white balancing apparatus as claimed in claim 3, wherein said red and blue determiner includes a first comparator having the red component signal output from said signal processing means as an input of the non-inverted input port, and a reference signal by the green component signal output from said signal processing means as an input of the inverted input port, a second comparator having the blue component signal output from said signal processing means as an input of the non-inverted input port, and a reference signal by the green component signal output from said signal processing means as an input of the inverted input port, and an exclusive OR gate for performing an EX-OR operation with respect to the signal output from said first and second comparators.

5. A white balancing apparatus as claimed in claim 2, wherein said chromatic color detecting means includes a green and magenta determiner for determining whether the input video signal is green and magenta chromatic color signal by using the red component signal, green component signal and blue component signal output from said signal processing means.

6. A white balancing apparatus as claimed in claim 5, wherein said green and magenta determiner includes a first comparator having the red component signal output from said signal processing means as an input of the non-inverted input port, and a reference signal by the green component signal output from said signal processing means as an input of the inverted input port, a second comparator having the blue component signal output from said signal processing means as an input of the non-inverted input port, and a reference signal by the green component signal output from said signal processing means as an input of the inverted input port, and an exclusive NOR gate for performing an EX-NOR operation with respect to the signals output from said first and second comparators.

7. A white balancing apparatus as claimed in claim 2, wherein said chromatic color detecting means includes a red and blue determiner for determining whether said input video signal is red and blue chromatic color signal using the red component signal, green component signal and blue component signal output from said signal processing means, a green and magenta determiner for determining whether said input video signal is green and magenta chromatic color using the red component signal, green component signal and blue component signal output from said signal processing means, and an OR gate for performing an OR operation with respect to the signals output from said red and blue determiner and said green and magenta determiner.

8. A white balancing apparatus as claimed in claim 7, wherein said red and blue determiner includes a first comparator having the red component signal output from said signal processing means as an input of the non-inverted input port, and a reference signal by the green component signal output from said signal processing means as an input of the inverted input port, a second comparator having the blue component signal output from said signal processing means as an input of the non-inverted input port, and a reference signal by the green component signal output from said signal processing means as an input of the inverted input port, and an exclusive OR gate for performing an EX-OR operation with respect to the signals output from said first and second comparators.

9. A white balancing apparatus as claimed in claim 7, wherein said green and magenta determiner includes a first comparator having the red component signal output from said signal processing means as an input of the non-inverted input port, and a reference signal by the green component signal output from said signal processing means, a reference signal as an input of the inverted input port, a second comparator having the blue component signal output from said signal processing means as an input of the non-inverted input port, and a reference signal by the green component signal output from said signal processing means as an input of the inverted input port, and an exclusive NOR gate for performing an EX-NOR operation with respect to the signals output from said first and second comparators.

10. A white balancing apparatus as claimed in claim 2, wherein said red gate includes a transistor having the signal output from said chromatic color detecting means as a gate input and the red component signal output from said signal processing means as a collector input, and a grounded emitter for switching.

11. A white balancing apparatus as claimed in claim 2, wherein said green gate includes a transistor having the signal output from said chromatic color detecting means as a gate input and the green component signal output from said signal processing means as a collector input, and a grounded emitter for switching.

12. A white balancing apparatus as claimed in claim 2, wherein said blue gate includes a transistor having the signal output from said chromatic color detecting means as a gate input and the blue component signal output from said signal processing means as a collector input, and a grounded emitter for switching.

* * * * *